(12) United States Patent
Sumi et al.

(10) Patent No.: US 12,271,024 B2
(45) Date of Patent: *Apr. 8, 2025

(54) ILLUMINATION DEVICE AND GAMING MACHINE EQUIPPED WITH SAME

(71) Applicant: OMRON CORPORATION, Kyoto (JP)

(72) Inventors: Masaaki Sumi, Kyoto (JP); Hiroyuki Onitsuka, Kyoto (JP); Takahiro Ono, Kyoto (JP)

(73) Assignee: OMRON Corporation, Kyoto (JP)

( * ) Notice: Subject to any disclaimer, the term of this patent is extended or adjusted under 35 U.S.C. 154(b) by 312 days.

This patent is subject to a terminal disclaimer.

(21) Appl. No.: 18/047,292

(22) Filed: Oct. 18, 2022

(65) Prior Publication Data

US 2023/0194772 A1 Jun. 22, 2023

(30) Foreign Application Priority Data

Nov. 29, 2021 (JP) ................. 2021-192785

(51) Int. Cl.

| | |
|---|---|
| *F21V 8/00* | (2006.01) |
| *F21V 14/02* | (2006.01) |
| *G07F 17/32* | (2006.01) |
| *G02F 1/1333* | (2006.01) |

(52) U.S. Cl.
CPC ............ *G02B 6/0091* (2013.01); *F21V 14/02* (2013.01); *G02B 6/0025* (2013.01); *G02B 6/0083* (2013.01); *G07F 17/3211* (2013.01); *G02F 1/13338* (2013.01)

(58) Field of Classification Search
CPC .. G02B 6/0091; G02B 6/0025; G02B 6/0083; F21V 14/02; G07F 17/3211; G02F 1/13338

See application file for complete search history.

(56) References Cited

U.S. PATENT DOCUMENTS

| | | | |
|---|---|---|---|
| 9,028,099 B2 * | 5/2015 | Spaccasassi | ............. F21K 9/65 362/249.02 |
| 10,989,858 B1 | 4/2021 | Onitsuka et al. | |
| 2004/0192430 A1 * | 9/2004 | Burak | ................. G02B 30/50 463/20 |

(Continued)

FOREIGN PATENT DOCUMENTS

| | | |
|---|---|---|
| JP | 2021-105675 A | 7/2021 |
| JP | 2021-140930 A | 9/2021 |

*Primary Examiner* — Malina D. Blaise
(74) *Attorney, Agent, or Firm* — METROLEX IP LAW GROUP, PLLC; Robert L. Scott, Esq

(57) ABSTRACT

A illumination device 10 is attached to a housing 41 of a gaming machine 40, and comprises LEDs 21a that emit light, light guide plates 20, a rotating body 23, a plate-shaped member 24, a motor 31, a lower case 13, and a control unit 44. A plurality of light guide plates 20 are attached to the plate-shaped member 24. The light guide plates 20 each have an end surface 20a on which the light emitted from the LEDs 21a is incident, and a flat surface 20b from which the incident light is emitted. The plate-shaped member 24 holds the light guide plate 20. The motor 31 rotates the rotating body 23 in the desired direction. The lower case 13 is provided with the motor 31, the rotating body 23 and the like are connected thereto in a state of being incapable of relative rotation, and the lower case 13 is installed in the housing 41 of the gaming machine 40.

16 Claims, 15 Drawing Sheets

(56) References Cited

U.S. PATENT DOCUMENTS

| | | | | |
|---|---|---|---|---|
| 2010/0120518 A1* | 5/2010 | Borissov | ................ | H05K 1/144 |
| | | | | 362/234 |
| 2014/0063415 A1* | 3/2014 | Oohira | ................ | G02B 6/0068 |
| | | | | 349/65 |
| 2017/0131456 A1* | 5/2017 | Morozov | ............. | G02B 6/0036 |
| 2018/0259701 A1* | 9/2018 | Yuki | ................ | G02F 1/133308 |
| 2019/0003697 A1* | 1/2019 | Lan | ........................ | F21V 19/006 |
| 2019/0041040 A1* | 2/2019 | Aubrey | .................. | F21V 5/008 |
| 2019/0064598 A1* | 2/2019 | Du | ........................ | G02B 6/0016 |
| 2019/0338897 A1* | 11/2019 | Brown | .................... | F21K 9/272 |
| 2020/0056762 A1* | 2/2020 | Xue | ........................ | F21V 21/30 |
| 2020/0183073 A1* | 6/2020 | Osumi | ................ | G02B 6/0036 |
| 2021/0031679 A1* | 2/2021 | Hong | ........................ | F21S 43/15 |
| 2021/0279997 A1* | 9/2021 | Onitsuka | ............. | G07F 17/3211 |
| 2022/0308282 A1* | 9/2022 | Onitsuka | ............. | G02B 6/0078 |
| 2023/0080699 A1* | 3/2023 | Shim | .................... | B60Q 1/5035 |
| | | | | 340/425.5 |
| 2023/0168426 A1* | 6/2023 | Sumi | ................ | G02F 1/133615 |
| | | | | 349/65 |
| 2024/0068643 A1* | 2/2024 | Ray | ........................ | F21V 21/30 |
| 2024/0167653 A1* | 5/2024 | Zhong | .................... | F21S 10/00 |

* cited by examiner

ILLUMINATION DEVICE AND GAMING MACHINE EQUIPPED WITH SAME

CROSS-REFERENCE TO RELATED APPLICATIONS

This application claims priority to Japanese Patent Application No. 2021-192785 filed on Nov. 29, 2021. The entire disclosure of Japanese Patent Application No. 2021-192785 is hereby incorporated herein by reference.

BACKGROUND

Technical Field

The present invention relates to an illumination device installed in the housing of a gaming machine in a casino or other such game facility, for example, and to a gaming machine equipped with this illumination device.

Description of the Related Art

In amusement facilities such as casinos, recent years have seen the use of illumination devices that include light guide plates with which light emitted from a light source such as an LED (light emitting diode) is incident from an end surface, reflected in the interior, and emitted from another surface.

For example, Patent Literature 1 discloses an illumination device in which a plurality of light guide plates are disposed in the up and down direction and spaced apart from each other, and the exit surfaces are disposed facing a window in a state of being slanted so as to be higher in the rear than in the front, in order to show users, etc., located somewhere other than in front of the device with a light presentation that has a better effect.

CITATION LIST

Patent Literature

Patent Literature 1: JP-A 2021-140930

SUMMARY

Problem to be Solved by the Invention

However, the following problem was encountered with the conventional illumination device discussed above.

That is, since the illumination device disclosed in the above-mentioned publication was configured such that the light from the light source was turned on and off in a state in which the light guide plates are fixed in place, a problem was that the illumination effect was always the same and it was difficult to make it distinctive.

It is an object of the present invention to provide an illumination device with which a wide range of presentations performances are possible and the illumination effect is enhanced in a gaming machine island including gaming machines, and gaming machine equipped with same.

Means for Solving Problem

The illumination device according to the first invention is an illumination device that is attached to the housing of a gaming machine, comprising light source units that emit light, light guide plates, a holding unit, a rotational drive unit, a base portion, and a control unit. The light guide plates each have an incident surface on which light emitted from the light source units is incident and an exit surface from which the light incident from the incident surface is emitted. The holding unit holds the light source units and the light guide plates. The rotational drive unit rotates the holding unit in the desired direction. The base portion is provided with the rotational drive unit, the holding unit is connected thereto in a state of being relatively rotatable, and this base portion is attached to the housing of a gaming machine. The control unit controls the rotation of the holding unit by the rotational drive unit.

Here, for example, in an illumination device provided to a slot machine or other such gaming machine installed in a casino or other such gaming facility, light guide plates on which light from a light source is incident and which emit light from a specific exit surface are rotationally driven.

Here, the housing of the gaming machine to which the illumination device is provided is, for example, a frame on the front side of the gaming machine, and the illumination device is attached on the left and right sides of the front side of the gaming machine, or on the upper end, etc.

The light source units are, for example, LEDs (light emitting diodes) or an LED board on which a plurality of LEDs or other such light sources are disposed, and is disposed at a position opposite the incident surfaces of the light guide plates.

The holding unit that holds the light source units and the light guide plates is, for example, a rotating-side members, which is rotationally driven by a motor or other such rotational drive unit in a state of holding the light source units and the light guide plates.

The rotational drive unit is, for example, a motor or the like controlled by the control unit, and rotates the holding unit while holding the light source unit and the light guide plate via a rotary shaft.

The base portion is, for example, a member on the non-rotating side, such as a case that houses the motor or other such rotational drive unit.

The control unit controls the rotation of the motor or other such rotational drive unit, such as the rotation speed, rotation direction, and rotation duration for which the holding unit is rotated.

Consequently, the light guide plates can be rotated in an illumination device provided to the housing of the gaming machine, which means that a wide variety of presentations can be achieved, as compared to a conventional illumination device including light guide plates that are fixed in place.

As a result, in a gaming machine island where the gaming machines are installed, a wider range of presentations than in the past is possible, and the illumination effect can be enhanced.

The illumination device according to the second invention is the illumination device according to the first invention, wherein the light guide plates further have a first end surface that is held by the holding unit. The light source units are disposed opposite the first end surface, and their light is incident on the first end surface.

Consequently, light from the first end surface is made to be incident on the light guide plates whose first end surfaces are held, and the light guide plates are rotated, so that light is emitted from the light guide plates, which are erected so as to protrude from the holding unit, and this makes possible a wider range of presentations than in the past, and enhances the illumination effect.

The illumination device according to the third invention is the illumination device according to the first or second invention, further comprising a rotary connector that is provided between the holding unit and the base portion and transmits power and electrical signals to the light source units held by the holding unit rotated by the rotational drive unit.

Consequently, power and electrical signals can be transmitted from the non-rotating side to the rotating side through the rotating connector while the holding unit that holds the light guide plates and the like is rotated.

The illumination device according to the fourth invention is the illumination device according to any of the first to third inventions, further comprising a bearing unit that is provided between the base portion and the holding unit, and that allows the holding unit, to which rotational drive force has been transmitted from the rotational drive unit, to slide relative to the base portion.

Consequently, because the bearing unit is provided between the base portion and the holding unit, the holding unit on the rotating side can be smoothly rotated with respect to the base portion on the non-rotating side.

The illumination device according to the fifth invention is the illumination device according to any of the first to fourth inventions, wherein the holding unit holds the plurality of light guide plates and the plurality of light source units in a substantially vertical direction.

Consequently, by rotating the plurality of light guide plates and light source units held by the holding unit (which is longer in the vertical direction) around a rotary shaft that is disposed along the substantially vertical direction, for example, a wide variety of presentations can be performed on the sides of the housing of the gaming machine, etc.

The illumination device according to the sixth invention is the illumination device according to any of the first to fifth inventions, wherein the holding unit holds the plurality of light guide plates and the plurality of light source units along an outer peripheral surface centered on the rotary shaft when rotated by the rotational drive unit.

Consequently, since a plurality of light guide plates and light source units are held on the outer peripheral surface of the holding unit centered on the rotary shaft of the holding unit, the presentation effect when rotated around the rotary shaft can be further enhanced.

The illumination device according to the seventh invention is the illumination device according to any of the first to sixth inventions, wherein the holding unit has a plate-shaped member extending in a substantially vertical direction. The plate-shaped member holds the end surfaces of the plurality of light guide plates along a substantially vertical direction.

Consequently, because the holding unit is configured to include a plate-shaped member that holds the plurality of light guide plates and extends in a substantially vertical direction, the plate-shaped member to which the plurality of light guide plates are attached can be rotated along with the members on the rotating side, allowing a wide variety of presentations to be performed.

The illumination device according to the eighth invention is the illumination device according to the seventh invention, wherein the holding unit further has a rotating body in which a plurality of the plate-shaped members are attached to the outer periphery and are rotated when a rotational drive force is transmitted from the rotational drive unit.

Consequently, because a plurality of light guide plates held by the plate-shaped members are rotated by rotating the rotating body to the outer periphery of which the plate-shaped members are attached, a wide variety of presentations can be performed.

The illumination device according to the ninth invention is the illumination device according to any of the first to eighth inventions, further comprising a relay board that is provided to the holding unit and electrically connects the control unit and the plurality of light source units.

Consequently, electric signals from the control unit can be transmitted to each of the plurality of light source units via the relay board.

The illumination device according to the tenth invention is the illumination device according to any of the first to ninth inventions, wherein the light guide plates further have a plurality of prisms that reflect the light emitted from the light source units onto the incident surface in a specific direction.

Consequently, in the light guide plates, the light incident from the incident surface can be reflected by the prisms and emitted from the exit surfaces.

The illumination device according to the eleventh invention is the electrical decoration device according to any of the first to tenth inventions, further comprising a linking shaft that is linked to the rotary shaft of the rotational drive unit and is fitted to the connection portion with the holding unit so as to be incapable of relative rotation, and thereby transmits the rotational drive force of the rotational drive unit to the holding unit.

Consequently, because the holding unit and the rotational drive unit are connected via a linking shaft, the rotational drive force can be transmitted to the holding unit to provide rotational drive.

The illumination device according to the twelfth invention is the illumination device according to any of the first to eleventh inventions, further comprising a cover member that covers the periphery of the holding unit and is optically transmissive.

Consequently, presentation effects can be produced by rotation and the light emitted from the light guide plates through the cover member made of an optically transmissive resin or the like.

The gaming machine according to the thirteenth invention comprises the illumination device according to any of the first to twelfth inventions, a housing to which the illumination device is attached, a display section that displays game content, an operation unit with which operations are inputted by a player, and a control unit that controls the rotational drive unit and the light source units of the illumination device.

Consequently, in a gaming machine in which the above-mentioned illumination device is attached to the housing, a wider range of presentations can be performed than in the past, and the illumination effect can be enhanced.

The gaming machine according to the fourteenth invention is the gaming machine according to the thirteenth invention, wherein the control unit controls the rotation by the rotational drive unit according to the state of play on the gaming machine.

Here, the state of play on the gaming machine includes, for example, a state in which the symbols nearly match up on a slot machine (called a "riichi" in Japanese), a state in which the symbols shown on the stopped reels match up, a state in which a high probability mode is entered, and so forth.

Consequently, it is possible to perform a wide variety of presentations that will be exciting to a player, such as rotating the light guide plates according to the state of the gaming machine, or changing the rotation speed.

The gaming machine according to the fifteenth invention is the gaming machine according to the thirteenth or fourteenth inventions, wherein the control unit controls at least one of the rotation speed, the rotation direction, and the rotation duration of the holding unit.

Consequently, because control is performed so as to change at least one of the rotation speed, the rotation direction, and the rotation duration of the holding unit that holds the light guide plates, the illumination device can perform a wider variety of presentations than in the past, and the illumination effect can be enhanced.

The gaming machine according to the sixteenth invention is the gaming machine according to any of the thirteenth to fifteenth inventions, wherein the control unit further controls at least one of the lighting pattern, the lighting duration, and the lighting interval of the light from the light source units.

Consequently, because control is performed so as to change at least one of the lighting pattern, the lighting duration, and the lighting interval of the light source units that irradiate the light guide plates with light, this can be combined with the illumination effect produced by the rotation of the holding unit that holds the light guide plates to produce a wide variety of presentations than in the past, and the illumination effect can be enhanced.

Effects

With the illumination device according to the present invention, a wider range of presentations than in the past is possible, and the illumination effect can be enhanced on a gaming machine.

DETAILED DESCRIPTION OF THE EMBODIMENTS

An illumination device 10 and the gaming machine 40 equipped with the same according to an embodiment of the present invention will now be described with reference to FIGS. 1 to 15B.

In this embodiment, some unnecessarily detailed description may be omitted. For example, detailed description of already known facts or redundant description of components that are substantially the same may be omitted. This is to avoid unnecessary repetition in the following description, and facilitate an understanding on the part of a person skilled in the art.

The applicant has provided the appended drawings and the following description so that a person skilled in the art might fully understand this disclosure, but does not intend for these to limit what is discussed in the patent claims.

(1) Configuration of Gaming Machine 40

Figure 1:
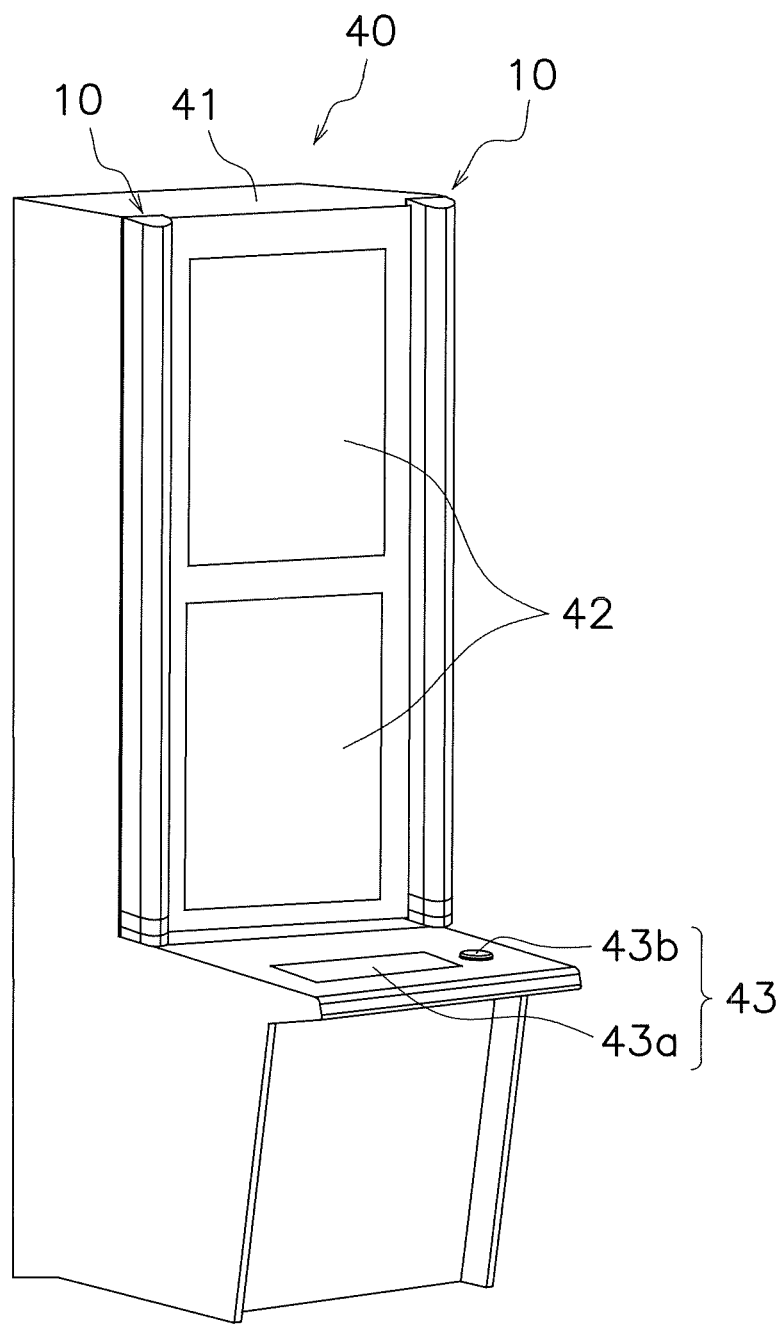
FIG. 1 is an overall oblique view of the configuration of a gaming machine on which the illumination device according to an embodiment of the present invention is installed.
Figure 2:
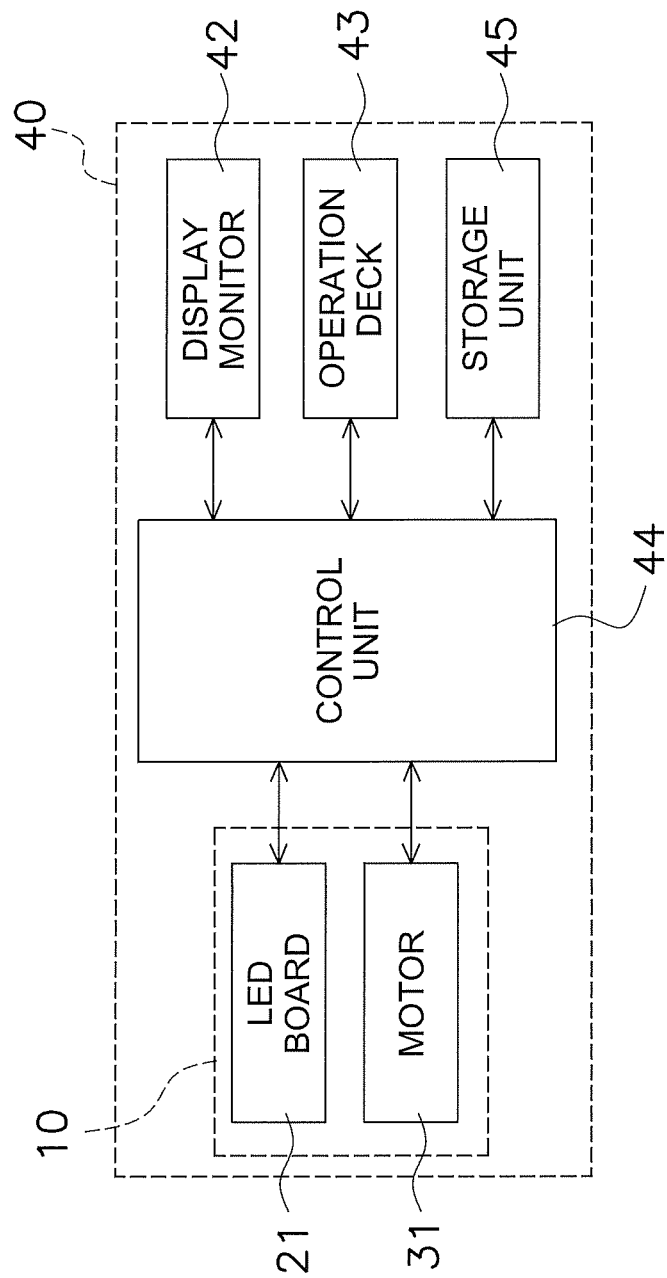
FIG. 2 is a control block diagram of the illumination device in FIG. 1.

The gaming machines 40 according to the present embodiment are, for example, slot machines provided to a casino or other such gaming facility, as shown in FIG. 1, and each comprise a housing 41, a display monitor (display unit) 42, an operation deck (operation unit) 43, a control unit 44 (see FIG. 2), and a storage unit 45 (see FIG. 2).

The housing 41 constitutes the outer profile of the gaming machine 40, and has a vertically oriented, substantially cuboid shape. Two display monitors 42 oriented vertically are provided to the housing 41 at positions corresponding to the player's eye level, on the front side opposite the player who is playing the gaming machine 40. Also, the housing 41 is provided with an operation deck 43 on which the player performs operation input, at a position below the display monitors 42 on the front side opposite the player.

The display monitors 42 display, for example, a plurality of reels that are spun and stopped by the player's operation, and the final result is determined by the combination of symbols displayed on the reels when the reels are stopped by the player's operation. Consequently, the gaming machine 40 awards prizes according to the final result of a spin, based on the combination of symbols shown on the stopped reels.

Also, with the gaming machine 40 in this embodiment, as shown in FIG. 1, the illumination devices 10 (discussed below) are disposed on the left and right sides of the display monitor 42 in the housing 41.

The display of a reel may be an image corresponding to the reel on a liquid crystal display screen or the like, or the reel itself provided as a rotating body may be disposed on the display monitor 42.

The operation deck 43 is provided on the upper surface of a portion provided so as to protrude toward the player in the lower portion of the housing 41. As shown in FIG. 1, the operation deck 43 is provided with an LCD (liquid crystal display) 43*a* and a push button 43*b*.

As shown in FIG. 1, in the operation deck 43, the LCD 43*a* is disposed from the center to the left side of the upper surface, and the push button 43*b* is disposed on the right side.

The LCD 43*a* is, for example, a touch panel type of liquid crystal display device, and accepts operation inputs from the player who is playing the gaming machine 40. In this embodiment, an operation for specifying the number of bets placed by the player playing the slot machine, an operation for spinning the reels, and other such operations are inputted to the LCD 43a, for example.

The push button 43b is an example of a gaming machine operation button included in the operation deck 43 of the gaming machine 40, which is pressed by the player during play on the slot machine in order to start the spinning of the reels displayed on the display monitor 42, for example.

As shown in FIG. 2, the control unit 44 is connected to the display monitor 42, the operation deck 43, the storage unit 45, and the illumination device 10, controls the gaming machine 40 during play, and controls the rotation of the illumination device 10 by the motor 31 and the lighting the LEDs 21a according to the state of play on the gaming machine 40. That is, the control unit 44 controls the gaming machine 40 and also controls the illumination device 10.

Here, the state of play on the gaming machine 40 means, for example, a state in which two of the symbols match up in the case of a slot machine (called a "riichi" in Japanese), a state in which the symbols shown on the stopped reels match up, a state in which a high probability mode is entered, and so forth.

Consequently, in addition to controlling the lighting pattern, lighting duration, and lighting interval of the LEDs 21a that emit light toward the light guide plates 20 in the illumination device 10 according to the state of play on the gaming machine 40, the rotation speed, rotation direction, rotation duration, and so forth of the rotating body 23 to which is attached the plate-shaped member 24 holding the light guide plates 20 are also controlled, and this piques the interest of the player and further enhances the illumination effect. As a result, the gaming machine 40 will be used more often, or the housing 41 of the gaming machine 40 will be noticed more often, among other such effects.

The storage unit 45 stores control programs and the like for controlling the operation of the gaming machine 40. The CPU reads the control program stored in the storage unit 45 and controls the game content of the gaming machine 40. The storage unit 45 also stores lighting patterns for lighting the LEDs 21a of the illumination device 10, lighting colors, control programs for controlling the rotation of the motor 31, and so on.

(2) Configuration of Illumination Device 10

As shown in FIG. 1, the illumination device 10 according to this embodiment is provided to the housing 41 of the gaming machines 40, such as slot machines, and installed in a casino or other such gaming facility. More precisely, the illumination device 10 is provided to both sides of a right and a left of a front of the gaming machines 40 in a view of the player. The illumination device 10 rotationally drives a plurality of light guide plates 20 on which light from LEDs (light sources) 21a is incident from an incident surface (end surface 20a), and which emits this light from a specific surface (exit surface) 20b.

Figure 3:
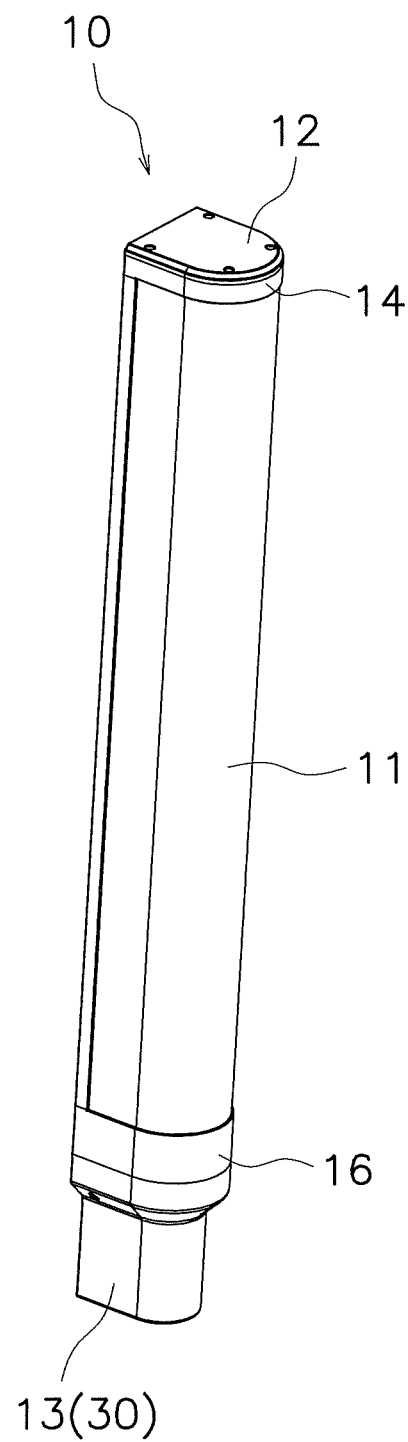
FIG. 3 is an oblique view of the external configuration of the illumination device mounted on the gaming machine in FIG. 1.

Also, as shown in FIG. 3, components that can be seen on the outside of the illumination device 10 include a cover member 11, an upper lid 12, a lower case (base portion) 13, a support portion 14, a back surface member 15 (see FIG. 6), a support portion 16, members on the rotating side (the light guide plate 20, etc.) (see FIG. 4), and a drive mechanism 30.

Figure 4:
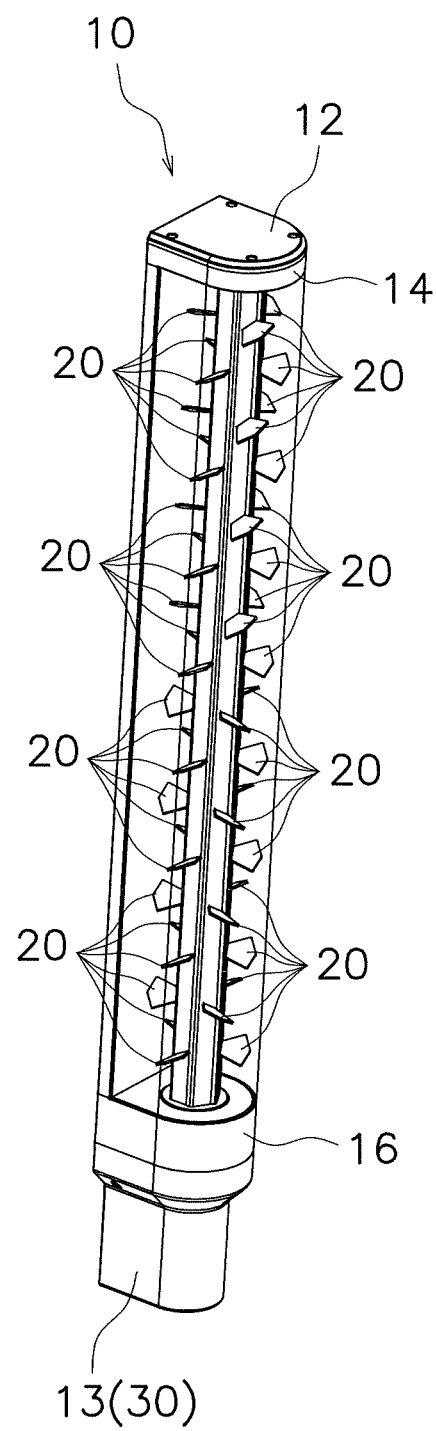
FIG. 4 is an oblique view of a state in which the cover member of the illumination device of FIG. 3 has been removed.

The cover member 11 is made of an optically transmissive resin such as PC (polycarbonate), for example, and is attached on the side where the player is playing the gaming machine 40. As shown in FIG. 4, the cover member 11 protects the plurality of light guide plates 20 and the like that rotate in the interior. Also, since the cover member 11 is molded from an optically transmissive resin, the presentation produced by the light emitted from the light guide plates 20 is visible from the outside.

Figure 5:
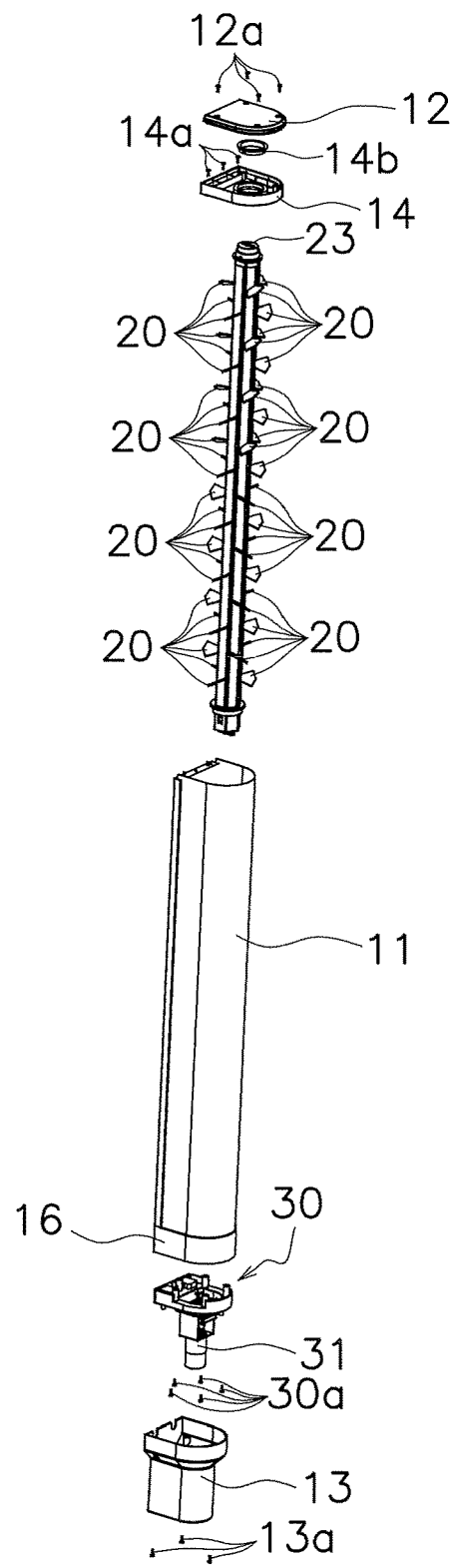
FIG. 5 is an exploded oblique view of the parts constituting the illumination device in FIG. 3.

The upper lid 12 is attached so as to cover the upper portion of the cover member 11. As shown in FIG. 5, the upper lid 12 is fixed to the upper surface of the support portion 14 with four screws 12a.

As shown in FIG. 5, the lower case 13 is a member on the non-rotating side that is attached so as to cover the lower portion of the cover member 11, and encloses the drive mechanism 30, such as the motor (rotational drive unit) 31. As shown in FIG. 5, the lower case 13 is fixed with three screws 13a to the lower end surface of the support portion 16 attached to the lower end of the cover member 11. The lower case 13 is connected to the rotating body (holding unit) 23 (discussed below) in a state of being incapable of relative rotation, and is installed to the housing 41 of the gaming machines 40.

As shown in FIG. 4, the support portion 14 is provided between the upper end portion of the cover member 11 and the upper lid 12. As shown in FIG. 5, the support portion 14 rotatably supports the upper end portion of the rotating-side members (the rotating body 23) by means of a ring-shaped shaft support portion 14b enclosed therein, and is fixed to the upper end surface of the back surface member 15 with a plurality of screws 14a.

Figure 6:
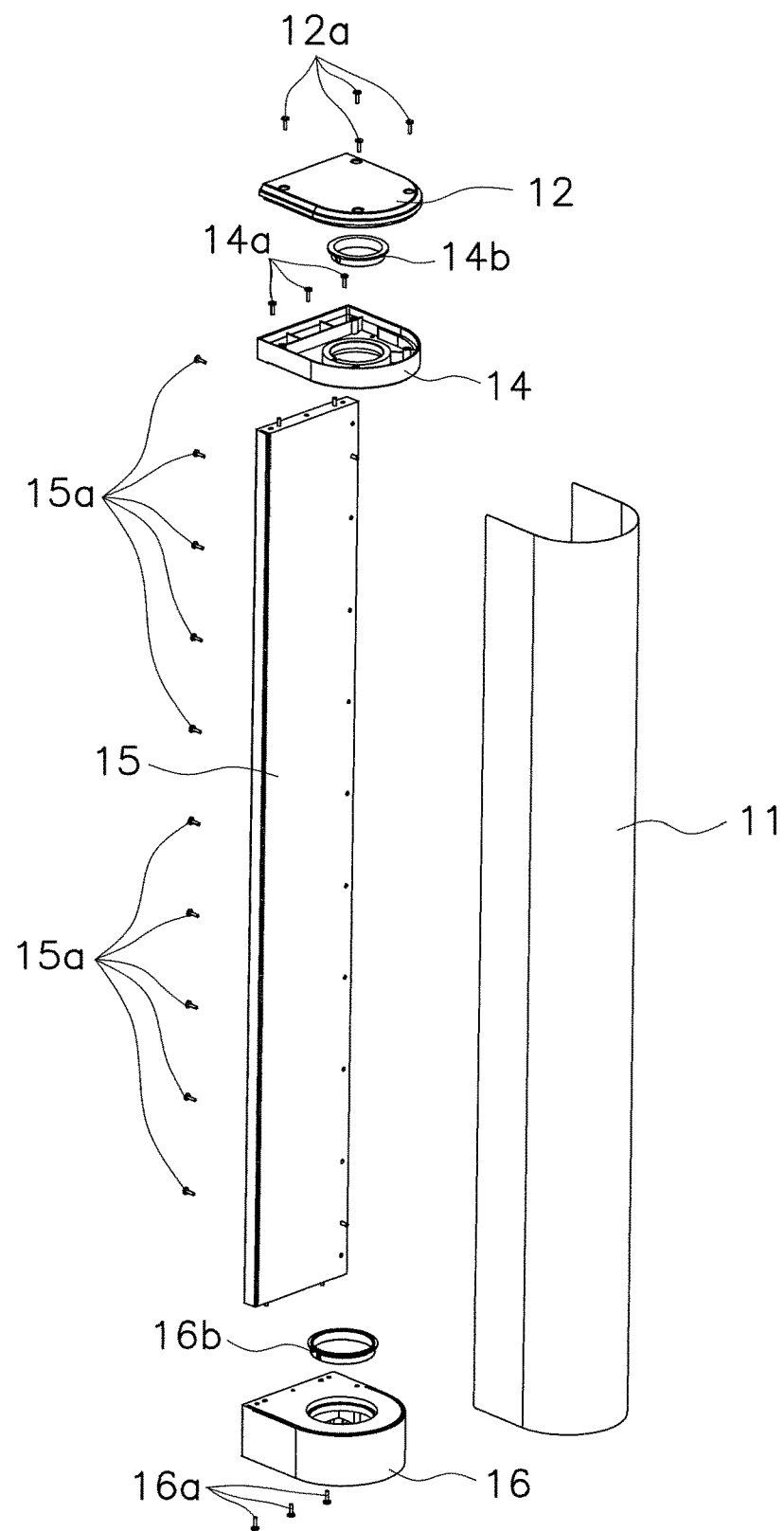
FIG. 6 is an exploded oblique view of the peripheral configuration of the cover member included in the illumination device in FIG. 3.

As shown in FIG. 6, the back surface member 15 is, for example, a black plate-like member disposed on the back side of the illumination device 10, and forms the surface on the side that is mounted to the housing 41 of the gaming machine 40. The back surface member 15 is fixed to the cover member 11 with a plurality of screws 15a.

As shown in FIG. 5, the support portion 16 is attached to the lower end portion of the cover member 11. The support portion 16 rotatably supports the lower end portion of the rotating-side members (the rotating body 23) by means of a ring-shaped shaft support portion 16b enclosed therein, and is fixed to the lower end surface of the back surface member 15 with a plurality of screws 16a.

Figure 7:
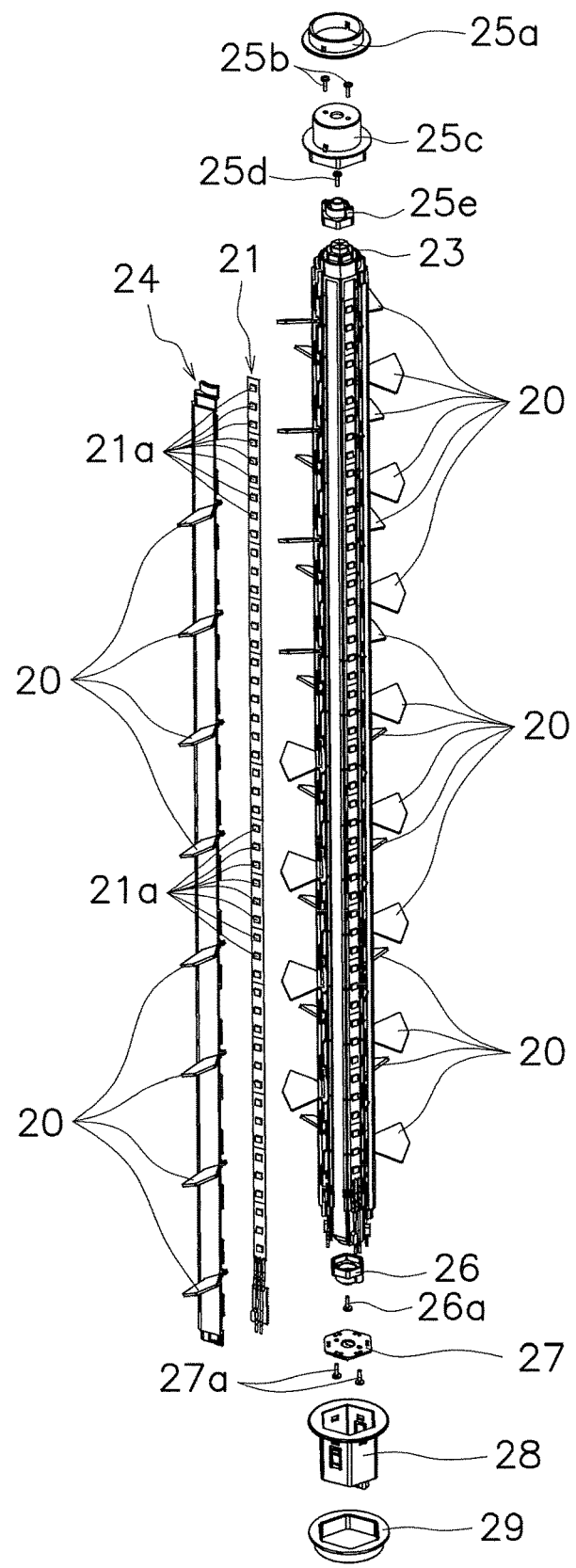
FIG. 7 is an exploded oblique view of the rotating-side members included in the illumination device in FIG. 3.

As shown in FIG. 7, the rotating-side members include the plurality of light guide plates 20, the LED (light emitting diode) board 21, the rotating body (holding unit) 23, the plate-shaped member (holding unit) 24, a flange 25a, a cylindrical portion 25c, an upper end member 25e, a lower end member 26, a relay board 27, a flange case 28, and a bearing unit 29.

The light guide plates 20 are, for example, plate-shaped members molded from a transparent resin, such as polymethylmethacrylate (PMMA), polycarbonate, a cycloolefin polymer, an acrylic resin, or the like. The light guide plates 20 each have an end surface (incident surface, first end surface) 20a on which light emitted from the LEDs 21a is incident, and a flat surface (exit surface) 20b from which the light incident from the end surface 20a is emitted. In the light guide plates 20, the light incident from the end surface 20a is internally diffused and emitted from the flat surface 20b, so that substantially uniform light is emitted from the flat surface 20b.

Figure 8:
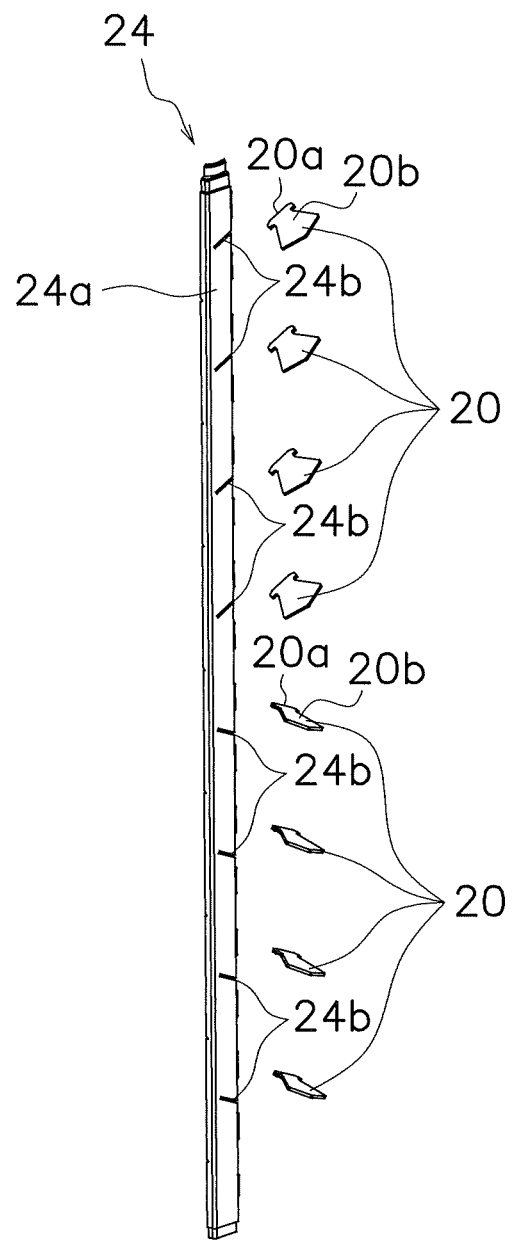
FIG. 8 is an oblique view of a plurality of light guide plates held by a plate-shaped member included in the rotating-side members in FIG. 7.

As shown in FIG. 8, the light guide plates 20 are fixed in a state of having been inserted into fixing grooves 24b formed obliquely with respect to the lengthwise direction of the main body 24a of the plate-shaped member 24. The LED board 21 is attached to the back side of the plate-shaped member 24 (the opposite side from the surface to which the light guide plates 20 are attached) so that the LEDs 21a are disposed at positions opposite the light guide plates 20.

Consequently, the LEDs 21a of the LED board 21 can make light be incident on the end surfaces 20a of the light guide plates 20 disposed on the front side.

Furthermore, the light guide plates 20 have a plurality of prisms 20c formed over almost the entire inner surface, which is on the opposite side from the flat surface 20b functioning as the exit surface. The prisms 20c reflect the light entering the light guide plates 20 from the end surfaces 20a, and emit the light from the exit surface (flat surface 20b) (see FIG. 15A).

LED (light emitting diode) board (light source) 21 is affixed to the outer peripheral surface of the rotating body 23 in a state in which a plurality of the LEDs 21a are disposed in the lengthwise direction on a slender tape-shaped member. More precisely, as shown in FIG. 7, the LED board 21 is disposed so as to be sandwiched between the outer peripheral surface of the rotating body 23 and the rear side of the main body 24a of the plate-shaped member 24.

Also, the LED board 21 is connected to the control unit 44 in the gaming machine 40 (see FIG. 2), and the control unit 44 controls the lighting timing, lighting color, lighting duration, and so forth of the LEDs 21a.

Some of the plurality of LEDs 21a (see FIG. 15A, etc.) are disposed at positions opposite the end surfaces 20a of the light guide plates 20, and emit light toward the end surfaces 20a.

The rotating body (holding unit) 23 is a member substantially in the form of a hexagonal prism, and rotates when a rotational drive force is transmitted from the motor 31 included in the drive mechanism 30. Also, as shown in FIG. 7, etc., the plate-shaped member 24 on which the light guide plates 20 are held in a substantially vertical direction is attached to the outer peripheral surfaces (six surfaces) of the rotating body 23.

A fitting groove 23a (see FIG. 13B) is formed in the lower end portion of the rotating body 23 for connection with the drive mechanism 30 side (linking shaft 37) (discussed below). The linking between the members on the rotating side and the drive mechanism 30 will be described in detail below.

The plate-shaped members (holding units) 24 are attached to the outer peripheral surface of the rotating body 23, and each have a main body 24a and fixing grooves 24b, as shown in FIG. 8.

As shown in FIG. 7, the main body 24a is a long, slender plate, in which a plurality of light guide plates 20 are attached to the front surface side, and which is attached to the outer peripheral surface of the rotating body 23 on its rear surface side.

As shown in FIG. 8, the fixing grooves 24b are formed obliquely with respect to the lengthwise direction of the main body 24a on the surface side of the main body 24a.

In this embodiment, eight fixing grooves 24b are provided in the main body 24a in order to enhance the light presentation effect of the light guide plates 20, with the upper four fixing grooves 24b being slanted upward to the right, and the four lower being slanted downward to the right.

As shown in FIG. 7, the flange 25a forms the upper end portion of the rotating-side members, and is attached to the upper end of the rotating body 23 via the cylindrical portion 25c and the upper end member 25e. When a rotational drive force is transmitted from the drive mechanism 30 to the rotating body 23, the flange 25a rotates together with the rotating body 23, etc., in a state of being supported on the shaft support portion 14b (see FIG. 6).

As shown in FIG. 7, the cylindrical portion 25c is a substantially cylindrical member, and the flange 25a is attached to the outer periphery thereof in a non-rotatable state. The cylindrical portion 25c is fixed to the upper surface of the upper end member 25e with screws 25b.

As shown in FIG. 7, the upper end member 25e is a member that is attached to the upper end of the rotating body 23, and is fixed to the upper end of the rotating body 23 with a screw 25d.

The lower end member 26 is a member that is attached to the lower end of the rotating body 23, and is fixed to the lower end of the rotating body 23 with a screw 26a.

The relay board 27 is a board that is provided as a rotating-side member, electrically connects the control unit 44 (see FIG. 2) and the plurality of LED boards 21, and relays power supply and the transmission of signals between the control unit 44 and the LED boards 21. Consequently, the control unit 44 can control each LED board 21 individually, so as to causing the plurality of LED boards 21 to emit light of different colors, etc. As shown in FIG. 7, the relay board 27 is fixed to the lower end surface of the lower end member 26 with screws 27a.

As shown in FIG. 7, the flange case 28 is a member substantially in the form of a hexagonal prism that encloses the relay board 27, the lower end member 26, etc., and constitutes the lower end portion of the rotating-side members.

Figure 10:
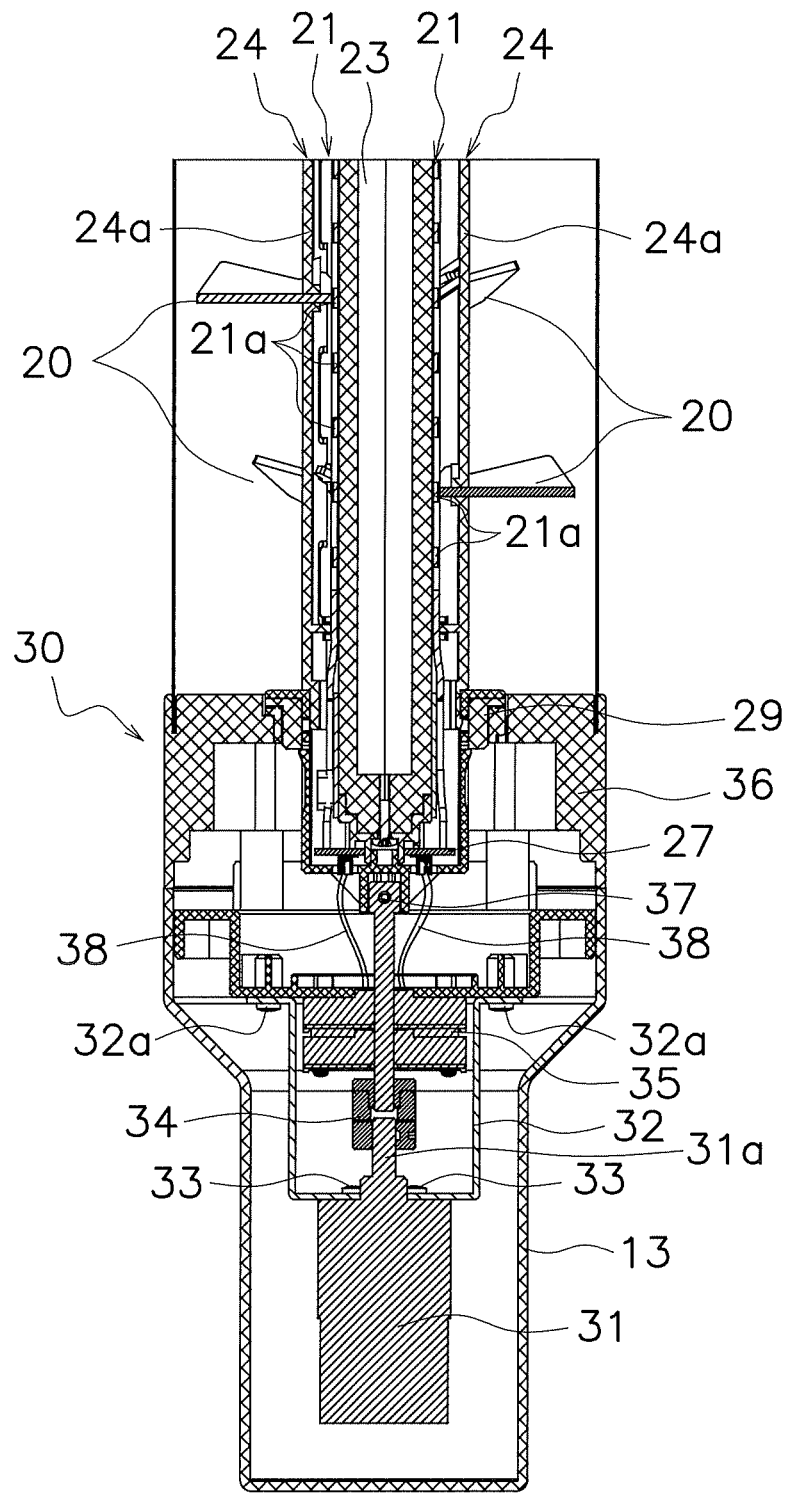
FIG. 10 is a cross-sectional view of the components around the drive mechanism in FIG. 9.

As shown in FIG. 7, the bearing unit 29 is attached to the outer peripheral surface of the flange case 28, and is provided at a position in contact with the non-rotating members in the installed state (see FIG. 10). The bearing unit 29 allows the rotating-side members (rotating body 23, etc.) to which the rotational drive force is transmitted from the motor 31 of the drive mechanism 30 to slide and rotate with respect to the non-rotating-side members (the lower case 13, the drive mechanism 30, etc.).

Figure 9:
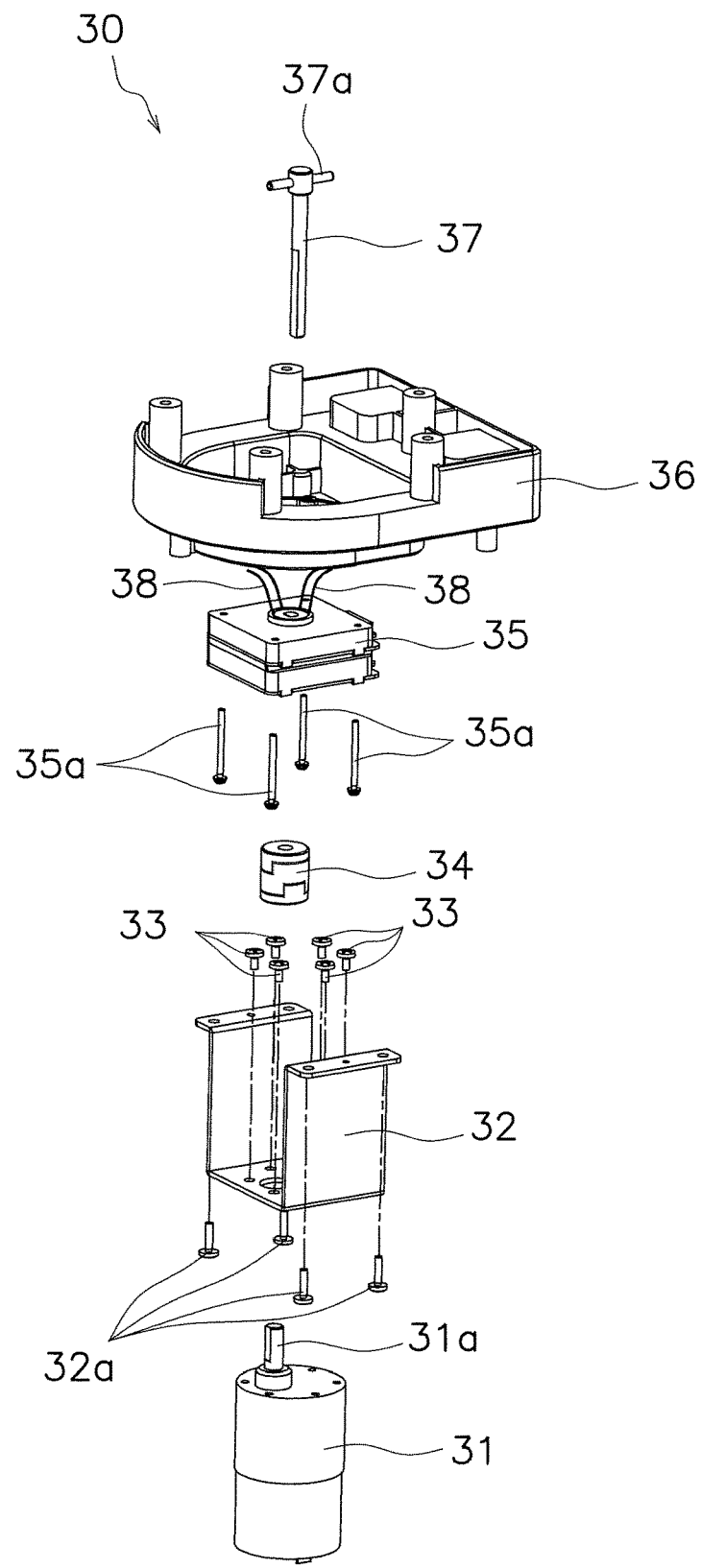
FIG. 9 is an exploded oblique view of the configuration of a drive mechanism included in the illumination device in FIG. 3.

As shown in FIG. 9, the drive mechanism 30 includes the motor (rotational drive unit) 31, a bracket 32, a coupling 34, a slip ring (rotational connector) 35, an upper case 36, a linking shaft 37, and a harness 38.

The motor 31 is connected to the above-mentioned control unit 44 in the gaming machine 40 (see FIG. 2), and the control unit 44 controls the rotation speed, rotation direction, rotation timing, rotation duration, etc., of the rotating-side members, including the light guide plates 20 and the like. As shown in FIG. 9, the motor 31 is fixed to the lower surface side of the bracket 32 with screws 33. Also, as shown in FIG. 9, the motor 31 has a rotary shaft 31a, and rotates the rotary shaft 31a to transmit rotational drive force to the above-mentioned rotating-side members.

As shown in FIG. 9, the bracket 32 is a plate-shaped member bent into a substantially U shape, and the motor 31 is attached to its lower surface and the coupling 34 and the like are attached to its upper surface. Also, the bracket 32 is fixed to the lower surface side of the upper case 36 with screws 32a.

As shown in FIG. 10, the coupling 34 links the rotary shaft 31a of the motor 31 and the linking shaft 37 to transmit the rotational drive force of the motor 31 to the linking shaft 37.

As shown in FIG. 9, the slip ring (rotary connector) 35 is fixed to the lower surface side of the upper case 36 with screws 35a. The slip ring 35 is provided as a non-rotating-side member, and transmits power and electrical signals to the LED board 21 held by the rotating-side members (rotating body 23, plate-shaped member 24, etc.) that are rotated by the motor 31.

Figure 11:
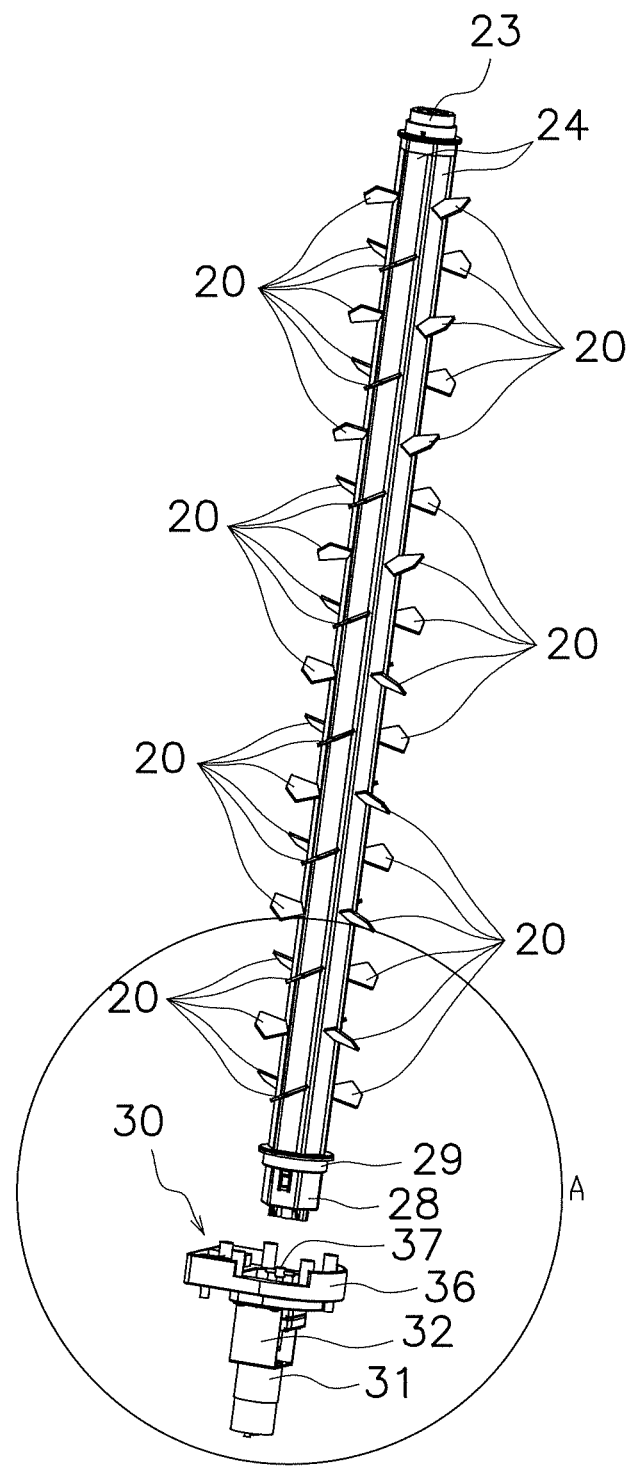
FIG. 11 is an oblique view of the linking between the rotating-side members in FIG. 7 and the drive mechanism in FIG. 9.

As shown in FIG. 9, the upper case 36 is a housing that forms the upper part of the drive mechanism 30, and as shown in FIG. 11, the rotating-side members (rotating body 23, plate-shaped member 24, etc.) are attached to the upper surface side thereof. More precisely, as shown in FIGS. 11 and 12, the flange case 28 and the bearing unit 29 that constitute the lower portion of the rotating-side members are attached so as to be inserted into the upper case 36.

Figure 12:
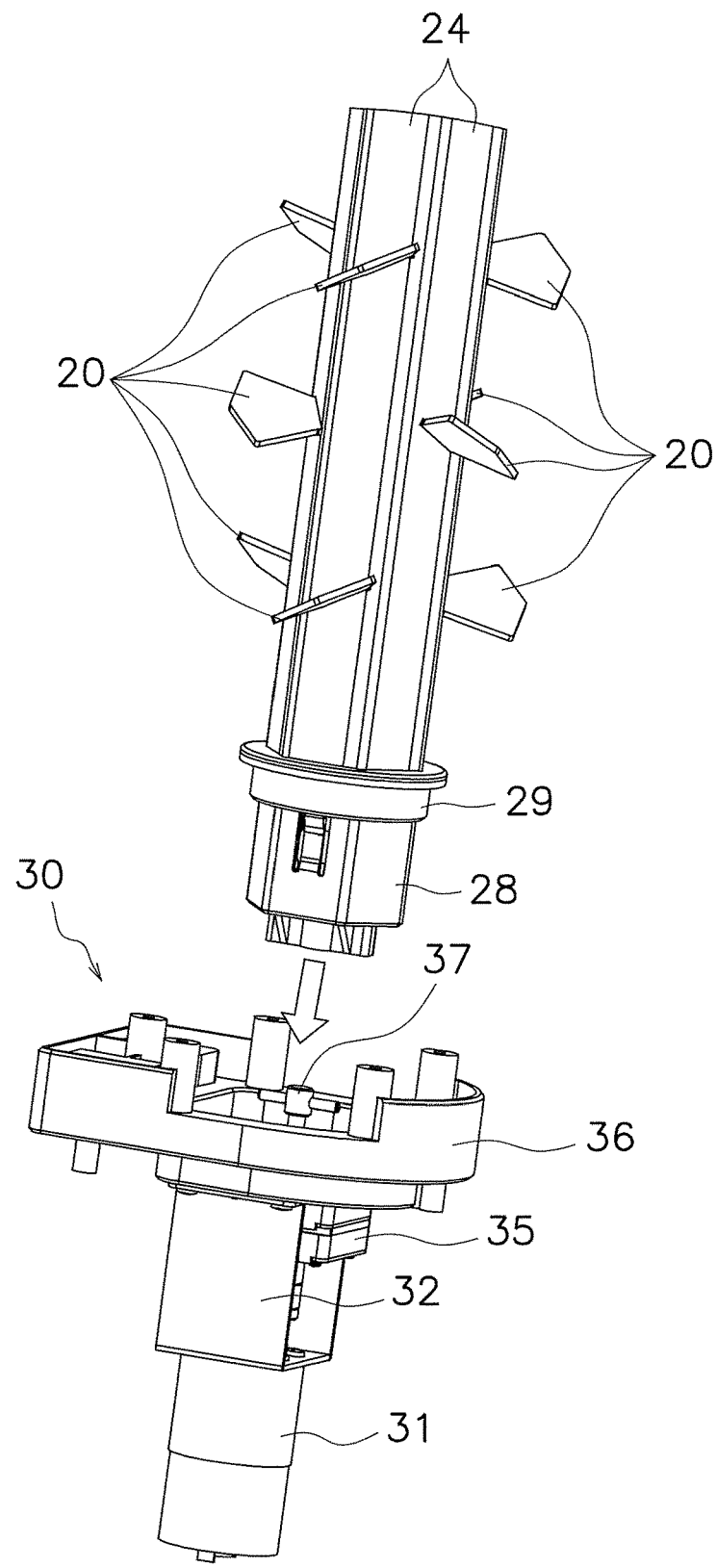
FIG. 12 is a detail view of the A portion in FIG. 11.

As shown in FIGS. 11 and 12, the linking shaft 37 is attached so as to be exposed on the upper surface side of the upper case 36, and transmits the rotational drive force of the motor 31 to the members on the rotating side (rotating body 23, etc.). As shown in FIG. 10, the linking shaft 37 has its lower end held by the coupling 34 and its upper end serving as a substantially T-shaped latching portion 37a.

Figure 13A:
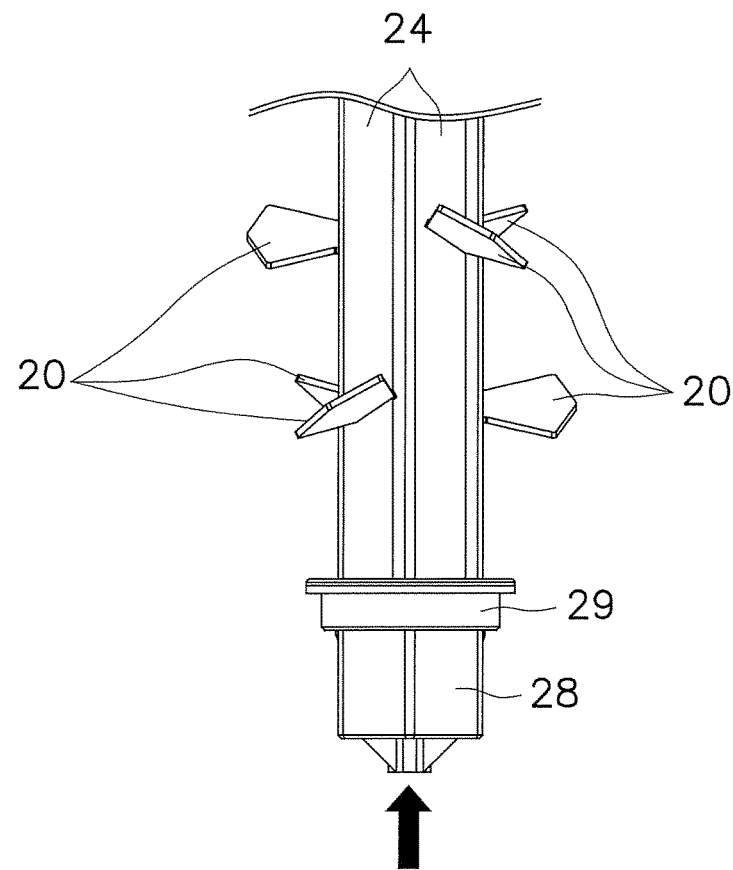
FIG. 13A is a front view of the lower portion on the rotating side.
Figure 13B:
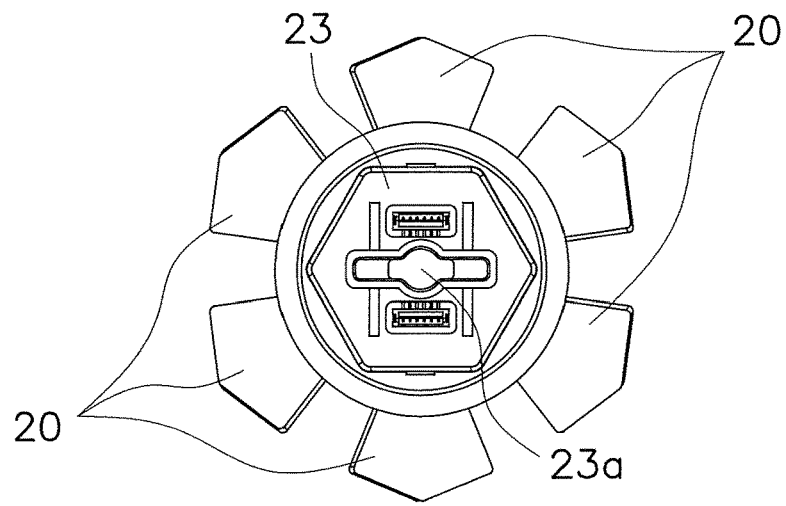
FIG. 13B is a plan view of a fitting groove on the rotating side, as seen from the direction of the arrow in FIG. 13A.

The latching portion 37a is a portion projecting substantially perpendicularly to the axial direction of the linking shaft 37, and fits into the fitting groove 23a formed in the lower end surface of the rotating body 23, as shown in FIGS. 13A and 13B.

Consequently, the rotational drive force of the motor 31 is transmitted from the rotary shaft 31a to the linking shaft 37 via the coupling 34. Furthermore, because the latching portion 37a of the linking shaft 37 is fitted into the fitting groove 23a of the rotating body 23, the rotational drive force transmitted to the linking shaft 37 is transmitted to the rotating body 23.

As shown in FIG. 9, the harness 38 is provided as a rotating-side member, and electrically connects the slip ring 35 on the non-rotating side and the relay board 27 on the rotating side. Even though the relay board 27 and the harness 38 rotate as rotating-side members, electric power, control signals, and the like are transmitted via the slip ring 35.

Figure 14:
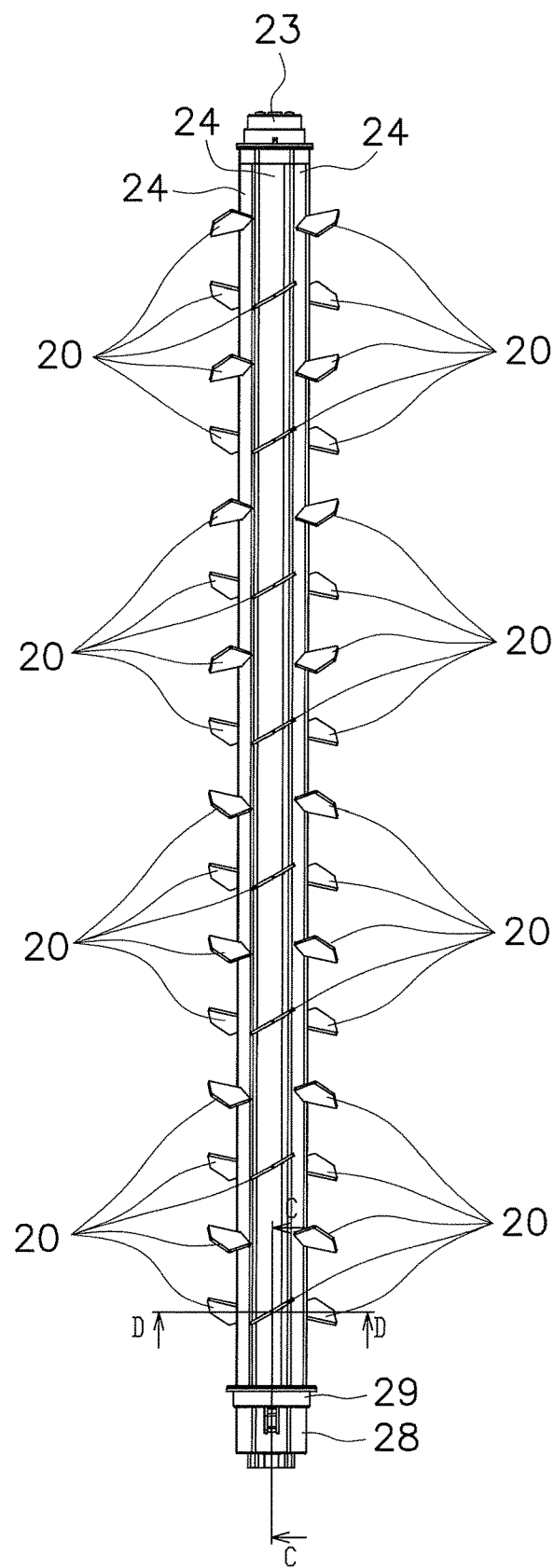
FIG. 14 is a front view of the components on the rotating side in FIG. 7.
Figure 15A:
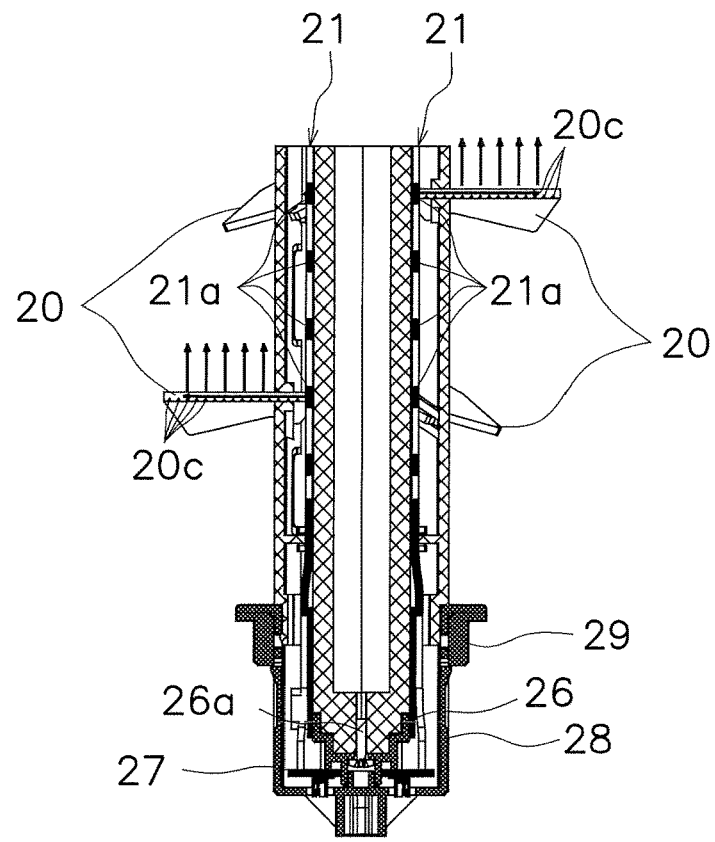
FIG. 15A is a cross-sectional view along the C-C line in FIG. 14.
Figure 15B:
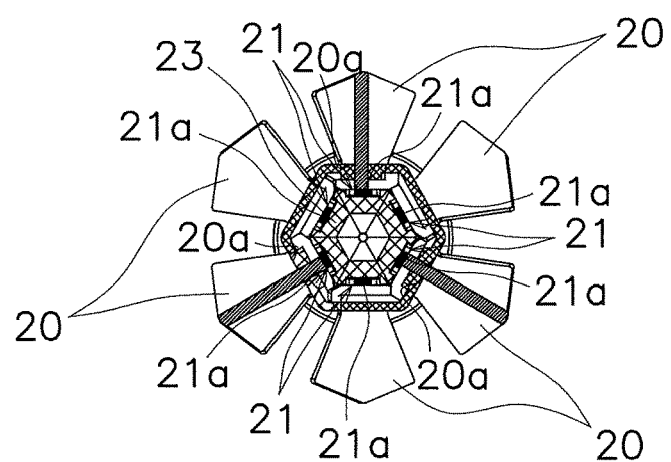
FIG. 15B is a cross-sectional view along the D-D line in FIG. 14.

As described above, the illumination device 10 of this embodiment is attached to the housing 41 of gaming machines 40, and comprises the LEDs 21a that emit light, the light guide plates 20, the rotating body 23, the plate-shaped member 24, the motor 31, the lower case 13, the control unit 44, and the control unit 44. As shown in FIG. 14, a plurality of light guide plates 20 are attached to the plate-shaped member 24 in the substantially vertical direction. As shown in FIGS. 15A and 15B, the light guide plates 20 each have an end surface 20a on which the light emitted from the LEDs 21a is incident, and a flat surface 20b from which the light incident from the end surface 20a is emitted. The rotating body 23 and the plate-shaped member 24 hold the LED board 21 and light guide plates 20. The motor 31 rotates the rotating body 23 and the plate-shaped member 24 in the desired direction. The lower case 13 is provided with the motor 31, is connected to the rotating body 23 and the plate-shaped member 24 in a state of being capable of relative rotation, and is installed on the housing 41 of the gaming machine 40. The control unit 44 controls the rotation of the rotating body 23 and the plate-shaped member 24 by the motor 31.

Consequently, in the illumination device 10 provided to the housing 41 of gaming machine 40, since the light guide plates 20 can be rotated, a wider variety of presentations is possible as compared to a conventional illumination device including light guide plates that are fixed in place.

As a result, on the gaming machine 40, the illumination device 10 enables a wider range of presentations than before and enhances the illumination effect.

As shown in FIGS. 15A and 15B, with the illumination device 10 in this embodiment, a plurality of light guide plates 20, which are provided along the substantially vertical direction with respect to the plate-shaped member 24 on the rotating side, are held by the plate-shaped member 24 at their end surfaces 20a. LEDs 21a are disposed at positions opposite the end surfaces 20a.

Consequently, light that is incident from the end surfaces 20a of the plurality of light guide plates 20 attached in an erected state to the plate-shaped member 24 is emitted from the flat surfaces 20b, and this further enhances the illumination effect.

In particular, with this embodiment, since the plurality of light guide plates 20 are attached obliquely to the lengthwise direction of the plate-shaped member 24, when the motor 31 rotates the members on the rotating side, the light guide plates 20 have an even better light presentation effect, and a wider variety of presentations can be performed.

Other Embodiments

An embodiment of the present invention was described above, but the present invention is not limited to or by the above embodiment, and various modifications are possible without departing from the gist of the invention.

(A)

In the above embodiment, an example was given in which the control unit 44 was provided in the gaming machine 40. However, the present invention is not limited to this.

For instance, a control unit that controls the rotation and/or lighting of the illumination device may be provided in the illumination device separately from the control unit that controls the gaming machine.

(B)

In the above embodiment, an example was given in which the illumination devices 10 were attached to the left and right sides of the housing 41 of the gaming machine 40. However, the present invention is not limited to this.

For instance, the configuration may be such that only one illumination device is provided to the housing of a gaming machine.

Also, the layout of the illumination devices is not limited to being on the left and right sides of the housing, and may, for example, be on the upper edge of the housing, the lower edge, or on just the left or right side of the housing.

(C)

In the above embodiment, an example was given in which the control unit 44 was provided in the gaming machine 40, and the control unit 44 controlled the rotation and/or lighting of the illumination device 10 in conjunction with the state of play on the gaming machine 40. However, the present invention is not limited to this.

For instance, the illumination device may be controlled without being related to the game content of the gaming machine.

(D)

In the above embodiment, an example was given in which light was incident from the LEDs 21a onto the end surfaces 20a of the light guide plates 20. However, the present invention is not limited to this.

For instance, the incident surface of the light guide plates is not limited to being the end surface, and may instead be a large flat surface.

Also, the exit surface of the light guide plates is not limited to being a large flat surface, and may instead be an end surface.

(E)

In the above embodiment, an example was given in which the plurality of light guide plates 20 were disposed along the substantially vertical direction, substantially parallel to the rotation axis. However, the present invention is not limited to this.

For instance, the configuration may be such that a plurality of light guide plates may be disposed in a substantially horizontal direction or in a diagonal direction relative to the horizontal direction.

(F)

In the above embodiment, an example was given in which the plurality of light guide plates 20 were attached to the outer peripheral surface of the rotating body 23 in a state of being held by a long, slender plate-shaped member 24 disposed along the substantially vertical direction. However, the present invention is not limited to this.

For instance, the configuration may be such that a plurality of light guide plates are directly held with respect to the rotating body.

(G)

In the above embodiment, an example was given in which the holder (the rotating body 23 and the plate-shaped member 24) to which the plurality of light guide plates 20 were attached was rotated along the substantially vertical direction. However, the present invention is not limited to this.

For instance, there may be only one light guide plate held by the holder, rather than a plurality.

(H)

In the above embodiment, an example was given in which the plate-shaped member 24 holding the plurality of light guide plates 20 was attached to the outer peripheral surface of the substantially hexagonal columnar rotating body 23. However, the present invention is not limited to this.

For instance, the shape of the rotating body to which the plate-shaped member holding the light guide plates is attached is not limited to being a substantially hexagonal prism, and may instead be a substantially quadrangular prism, a substantially octagonal prism, or other such shapes.

(I)

In the above embodiment, an example was given in which the upper half (four) of the fixing grooves 24b in the main body 24a were formed slanting upward to the right, and the lower half (four) were formed slanting downward to the right. However, the present invention is not limited to this.

For instance, the layout, orientation, number, and so forth of the fixing grooves that hold the light guide plates are not limited to the configuration of the above embodiment, and other layouts, orientations, and the like may be used instead.

INDUSTRIAL APPLICABILITY

The illumination device of the present invention exhibits the effect of enabling a wider range of presentations than in the past and enhancing the illumination effect in the gaming machine, and as such can be widely applied as an illumination device used in various kinds of gaming machine installed in casinos and other such gaming facilities.

REFERENCE SIGNS LIST 10 illumination device
11 cover member
12 upper lid
12a screw
13 lower case (base part)
13a screw
14 support portion
14a screw
14b shaft support portion
15 back surface member
15a screw
16 support portion
16a screw
16b shaft support portion
20 light guide plate
20a end surface (incident face, first end surface)
20b flat surface (exit surface)
20c prism
21 LED board (light source)
21a LED (light source)
23 rotating body (holding unit)
23a fitting groove
24 plate-shaped member (holding unit)
24a main body
24b fixing groove
25a flange
25b screw
25c cylindrical portion
25d screw
25e upper end member
26 lower end member
26a screw
27 relay board
27a screw
28 flange case
29 bearing unit
30 drive mechanism
31 motor (rotational drive unit)
31a rotary shaft
32 bracket
32a screw
33 screw
34 coupling
35 slip ring (rotational connector)
35a screw
36 upper case
37 linking shaft
37a latching portion
38 harness
40 gaming machine
41 housing
42 display monitor (display unit)
43 operation deck
43a LCD (operation unit)
43b push button (operation part)
44 control unit
45 storage unit

The invention claimed is:

1. An illumination device attached to a housing of a gaming machine, the illumination device comprising:
light source units configured to emit light;
light guide plates that each have an incident surface on which light emitted from the light source units is incident and an exit surface from which a light incident from the incident surface is emitted;
a holding unit that holds the light source units and the light guide plates;
a rotational drive unit configured to rotate the holding unit in a desired direction; and
a base portion to which the rotational drive unit is provided, to which the holding unit is connected in a state of being relatively rotatable, and which is attached to the housing of the gaming machine.

2. The illumination device according to claim 1,
wherein the light guide plates further have a first end surface that is held by the holding unit, and
the light source units are disposed opposite the first end surface, and their light is incident on the first end surface.

3. The illumination device according to claim 1,
further comprising a rotary connector that is provided between the holding unit and the base portion and is configured to transmit power and electrical signals to the light source units held by the holding unit rotated by the rotational drive unit.

4. The illumination device according to claim 1,
further comprising a bearing unit that is provided between the base portion and the holding unit and is configured to allow the holding unit, to which rotational drive force has been transmitted from the rotational drive unit, to slide relative to the base portion.

5. The illumination device according to claim 1,
wherein the holding unit holds the plurality of light guide plates and the plurality of light source units along a substantially vertical direction.

6. The illumination device according to claim 1,
wherein the holding unit holds the plurality of light guide plates and the plurality of light source units along an outer peripheral surface centered on a rotary shaft when rotated by the rotational drive unit.

7. The illumination device according to claim 1,
wherein the holding unit has a plate-shaped member extending in a substantially vertical direction, and
the plate-shaped member holds an end surfaces of the plurality of light guide plates along a substantially vertical direction.

8. The illumination device according to claim 7,
wherein the holding unit further has a rotating body in which a plurality of the plate-shaped members are attached to an outer periphery and are configured to rotate when a rotational drive force is transmitted from the rotational drive unit.

9. The illumination device according to claim 1,
further comprising a relay board that is provided to the holding unit and is configured to electrically connect the plurality of light source units.

10. The illumination device according to claim 1,
wherein the light guide plates further have a plurality of prisms configured to reflect the light emitted from the light source units onto the incident surface in a specific direction.

11. The illumination device according to claim 1,
further comprising a linking shaft that is linked to a rotary shaft of the rotational drive unit and is fitted to a connection portion with the holding unit so as to be incapable of relative rotation, and is configured to thereby transmit a rotational drive force of the rotational drive unit to the holding unit.

12. The illumination device according to claim 1,
further comprising a cover member that covers a periphery of the holding unit and is optically transmissive.

13. A gaming machine, comprising:
the illumination device according to claim 1;
a housing to which the illumination device is attached;
a display unit configured to display game content;
an operation unit with which operations are inputted by a player; and
a control unit configured to control the rotational drive unit and the light source units of the illumination device.

14. The gaming machine according to claim 13,
wherein the control unit controls a rotation by the rotational drive unit according to a state of play on the gaming machine.

15. The gaming machine according to claim 13,
wherein the control unit controls at least one of a rotation speed, a rotation direction, and a rotation duration of the holding unit.

16. The gaming machine according to claim 13,
wherein the control unit further controls at least one of a lighting pattern, a lighting duration, and a lighting interval of the light from the light source units.

* * * * *